United States Patent [19]

Bullock et al.

[11] Patent Number: 4,754,368

[45] Date of Patent: Jun. 28, 1988

[54] TERMINAL FOR WATTHOUR METERS

[75] Inventors: Donald F. Bullock, Somersworth, N.H.; Robert C. Mayo, Kennebunkport, Me.

[73] Assignee: General Electric Company, Somersworth, N.H.

[21] Appl. No.: 36,319

[22] Filed: Apr. 9, 1987

[51] Int. Cl.⁴ ........ H02B 9/00

[52] U.S. Cl. ........ 361/372; 439/883

[58] Field of Search ........ 174/153 R; 439/174, 439/733, 883; 361/364, 372, 373, 374, 375, 425, 426, 427

[56] References Cited

U.S. PATENT DOCUMENTS

| | | | |
|---|---|---|---|
| 1,180,397 | 4/1916 | Hooker . | |
| 1,739,262 | 12/1929 | Sachs | 439/883 |
| 2,100,731 | 11/1937 | Bradshaw | 171/34 |
| 2,117,904 | 5/1938 | Mylius | 247/2 |
| 2,534,449 | 12/1950 | Johanssen | 361/375 |
| 2,643,362 | 6/1953 | Johansson | 339/36 |
| 3,050,706 | 8/1962 | Kitscha | 339/246 |
| 3,134,931 | 5/1964 | Kobryner | 361/372 |
| 3,205,470 | 9/1965 | Tyler | 339/32 |
| 3,264,600 | 8/1966 | Barth et al. | 339/31 |
| 3,366,845 | 1/1968 | Asler | 361/372 |
| 3,431,543 | 3/1969 | Pietenpol | 174/153 R |
| 3,754,204 | 8/1973 | Raitport et al. | 339/32 R |

*Primary Examiner*—G. P. Tolin
*Attorney, Agent, or Firm*—Robert E. Brunson; Thomas R. Morrison

[57] ABSTRACT

A terminal for a watthour meter employs an offset portion internal to the watthour meter for disposing contacting surfaces for connection to current-coil conductors at four different transverse locations. Formation of the offset produces an under surface used as one element for capturing and applying compression force to a washer over a terminal gasket. A projection from the opposite surface of the terminal forms a bearing surface as the other element for applying compression force to the washer over the terminal gasket. Two holes, optionally tapped, are provided for connection of a voltage coil lead. One of the two holes remains free for connection even though the other may be covered by the current-coil conductor.

3 Claims, 5 Drawing Sheets

TERMINAL FOR WATTHOUR METERS

BACKGROUND OF THE INVENTION

The present invention relates to electric watthour meters and, more particularly, to terminals for connecting watthour meters to external circuits.

Conventional watthour meters as used in the United States generally fall into two categories: detachable and bottom-connected. The present invention is particularly directed toward detachable meters.

According to governing standards of the American National Standards Institute (ANSI), a detachable (socket-mounted) watthour meter includes a generally circular base supporting the metering and registering components. Bayonet-type blade terminals pass through the back of the base, arranged for insertion into mating jaws of a meter socket, or other detachable meter mounting device. The ANSI standard also governs the locations and dimensions of the portions of the terminal blades external to the base. The shape of the portions of the terminals internal to the watthour meter are at the discretion of the manufacturer.

A conventional electro-mechanical watthour meter employs a conductive metal disk driven as the rotor of a small induction motor by the interaction of magnetic fluxes generated by opposed voltage and current stators. The voltage and current stators are conventionally disposed facing and spaced apart from each other with the metallic disk in the gap between them.

The voltage and current stators, as well as the elements supporting the disk, are mounted on a frame generally made of cast aluminum. The frame is, in turn, attached to the base.

One, two or three sets of voltage and current stators are found in conventional watthour meters. The voltage and current stators, as well as other elements within the watthour meter, occupy a substantial part of the limited space within the watthour meter. The locations, shapes and sizes of the internal elements are governed by standards and by technical requirements and are generally beyond the control of the designer.

Each current stator consists of an assembly of thin iron laminations forming a U-shaped magnetic core, with two magnetic poles facing the disk. A current coil consisting of a few turns of large-diameter insulated conductor is wound about one leg of the U-shaped core to magnetize the core and produce a magnetic flux at its poles in proportion to the load current. A terminal is connected to the end of each of the two leads of a current coil for making external connections to the meter socket.

The current coil and its leads carry the entire load current to be measured and are thus given large cross sections to avoid excessive heating. Such large cross sections make the leads rigid and incapable of substantial manual bending or manipulation to fit them to the internal parts of a meter. It thus becomes a problem to route the leads of the current stator around internal elements, over which the designer has little if any control, for connection to an internal part of the terminal.

Co-pending U.S. patent application Ser. No. 711,716 discloses an improved current coil in which the center line of the current coil coincides with the center line of the terminal blade, thereby permitting a single coil design to serve for current stators in both left and right positions in the watthour meter. This places even further restrictions on the routing of the leads of the current stators.

A coil of each voltage stator is also connected to terminals. However, the voltage-stator coil is made up of many turns of a fine-gauge wire, thereby attaining a high impedance. Thus, only a small current flows in the voltage coil, and the problem of attaining adequate electrical connection between the voltage coil and the terminals is simplified. In many cases, satisfactory connection can be made with flexible insulated wire attached to the terminals with screws or soldering.

The routing requirements for the current-coil leads, combined with their stiffness, conventionally dictate that the ends of the leads lie at positions offset from a plane defined by the respective blades of the terminals. It thus is conventional to form terminals with internal offsets for interfacing with their current-coil leads while maintaining the external configuration according to ANSI standards.

Different watthour meter designs have sufficiently different lead-routing constraints that the internal terminal offsets vary from watthour meter to watthour meter. It is thus necessary for a manufacturer to employ a number of different terminal designs for meeting the offset requirements of its line of watthour meters. Further variations in terminal design are often required to accommodate current-coil conductors of different ampere ratings. Still further variations may be required to permit screw or solder attachment of voltage-coil leads to the terminals.

The resulting variety of terminals represents a significant cost in design, tooling, machine set-up time, inventory and administration. The short manufacturing runs engendered by such variety leads to manufacturing inefficiency.

OBJECTS AND SUMMARY OF THE INVENTION

It is an object of the invention to provide a meter terminal which overcomes the drawbacks of the prior art.

It is a further object of the invention to provide a meter terminal useable in a plurality of watthour meters having a range of positions of connecting portions of current-coil leads.

It is a further object of the invention to provide a meter terminal suitable for installation in any one of a plurality of locations in a base of at least one watthour meter.

It is a further object of the invention to provide a universal terminal for a watthour meter.

It is a further object of the invention to provide means for attaching voltage-coil leads to a universal watthour meter terminal.

It is a still further object of the invention to provide for location of a terminal washer and gasket by the shaping of the terminal, whereby machine operations are reduced.

Briefly stated, the present invention provides a terminal for a watthour meter employing an offset portion internal to the watthour meter for disposing contacting surfaces for connection to current-coil conductors at four different transverse locations. Formation of the offset produces an under surface used as one element for capturing and applying compression force to a washer over a terminal gasket. A projection from the opposite surface of the terminal forms a bearing surface as the other element for applying compression force to the washer over the terminal gasket. Two holes, optionally tapped, are provided for connection of a voltage coil lead. One of the two holes remains free for connection even though the other may be covered by the current-coil conductor.

According to an embodiment of the invention, there is provided a terminal for a watthour meter comprising: a generally planar terminal blade, a generally planar offset portion having first and second faces, the offset portion being generally parallel to the terminal blade, the offset portion being offset a predetermined distance from a center line of the terminal blade, a transverse portion connecting the terminal blade and the offset portion, the transverse portion having an under surface effective for bearing against a surface, the terminal including a projection generally aligned on an opposed side of the terminal with the under surface, the projection forming a bearing surface for bearing against the surface, and the predetermined distance being effective for permitting attachment to one of the first and second faces to conductors disposed in a vicinity of at least four transverse positions from the center line.

According to a feature of the invention, there is provided a watthour meter, comprising: a base, at least one hole through the base, a surface surrounding the hole inside the base, a terminal, a generally planar terminal blade on the terminal projecting outward from the hole, a generally planar offset portion on the terminal inside the base, the offset portion having first and second faces, the offset portion being generally parallel to the terminal blade, the offset portion being offset a predetermined distance from a center line of the terminal blade, a transverse portion connecting an inner extension of the terminal blade and the offset portion, a resilient terminal gasket surrounding the inner extension and bearing against the surface, a terminal washer surrounding the inner extension and bearing against an outer surface of the terminal gasket, the transverse portion having an under surface effective for bearing against the terminal washer at a first side of the terminal, a projection generally aligned on an opposed side of the terminal with the under surface, the projection forming a bearing surface for bearing against the terminal washer at a second side of the terminal, means for urging the terminal outward, whereby the transverse portion and the bearing surface apply compressive force on the terminal washer and terminal gasket, and the predetermined distance being effective for permitting attachment to one of the first and second faces of conductors disposed in a vicinity of at least four transverse positions from the center line.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
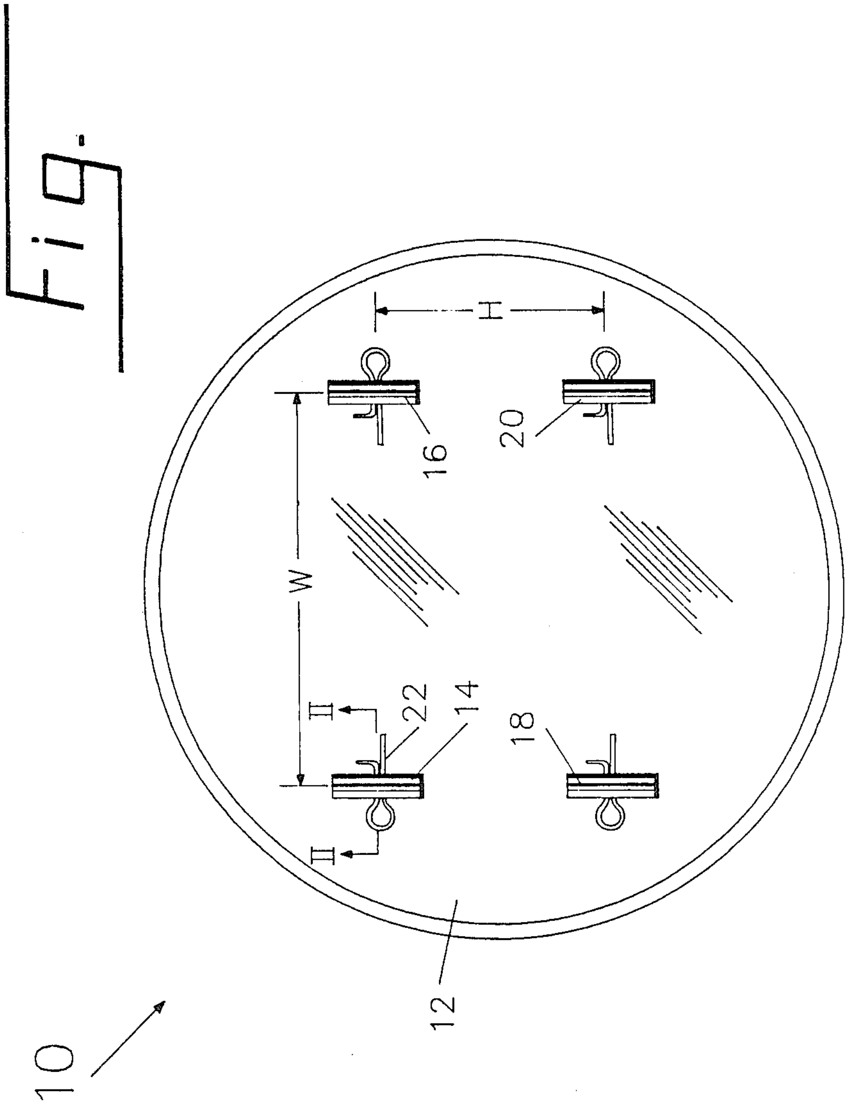
FIG. 1 is a rear view of an electric watthour meter adapted for use with the universal terminal of the present invention.

Referring first to FIG. 1, there is shown, generally at 10, a rear view of an electric watthour meter. A base 12, conventionally of an insulating material such as, for example, a molded plastic, includes a plurality of line terminal blades 14 and 16 and a plurality of load terminal blades 18 and 20 extending outward therefrom. Line terminal blades 14 and 16, and load terminal blades 18 and 20 are secured in position by conventional cotter pins 22 passing therethrough.

Line terminal blades 14 and 16 in an upper row conventionally are connected to the utilities service lines and load terminal blades 18 and 20 are connected to the consumer's load terminals. Usually, each terminal in the upper row corresponds to a terminal in the lower row. Current coils and leads (not shown) within electric watthour meter 10 connect corresponding upper and lower terminals. That is, one end of each current coil is connected to a line terminal in the upper row and the other end to a corresponding load terminal in the lower row.

The dimensions of each terminal blade is specified in the applicable ANSI standard. In addition, ANSI standards specify a horizontal spacing W between columns and a vertical spacing H between rows of terminal blades.

Additional terminal blades (not shown) may be provided in some installations requiring additional connections to electric watthour meter 10. Such additional terminal blades are omitted herefrom since it is believed that the present disclosure will be properly interpreted by one skilled in the art to encompass any number of terminals.

Figure 2:
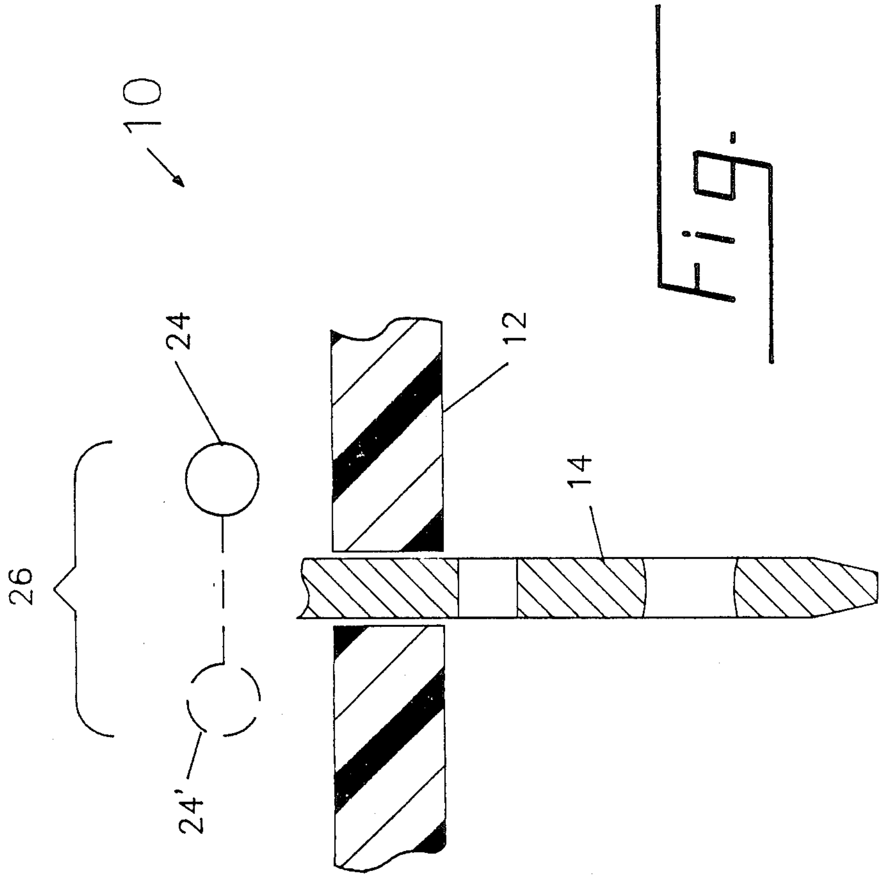
FIG. 2 is a simplified cross section of a portion of a terminal showing a range of transverse positions into which a current-coil conductor may fall.

Referring now to the cross section of line terminal blade 14 in FIG. 2 wherein cotter pin 22 is omitted to reduce clutter, a current-coil lead 24 is illustrated in solid line at one extremity of a range of transverse positions it may occupy in order to permit internal routing around fixed objects. A current-coil lead 24' is illustrated in dashed line at the other end of the range of transverse positions. A brace 26 indicates the range of transverse positions which a universal terminal may be required to accommodate. As noted in the foregoing, such a range of possible positions in different electric watthour meters 10 conventionally requires a plurality of different designs for line terminal blade 14 with consequent manufacturing and cost inefficiencies.

Figure 3:
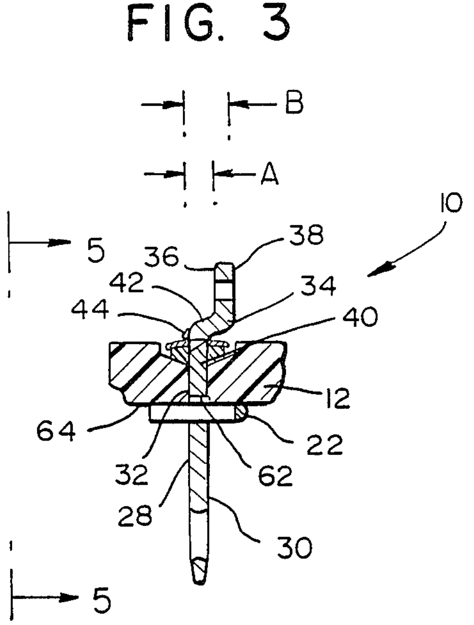
FIG. 3 is a cross section of a terminal according to an embodiment of the invention.

Referring now to FIG. 3, a universal terminal 28, according to an embodiment of the invention, includes a terminal blade 30 protruding outward from a hole 32 molded into base 12. An offset portion 34 of universal terminal 28 inside electric watthour meter 10 includes a first face 36 disposed a first offset distance A from a center line of terminal blade 30 and a second face 38 offset a second offset distance B from the center line. An inner extension 40 of terminal blade 30 is joined to offset portion 34 by a transverse portion 42.

Figure 4:
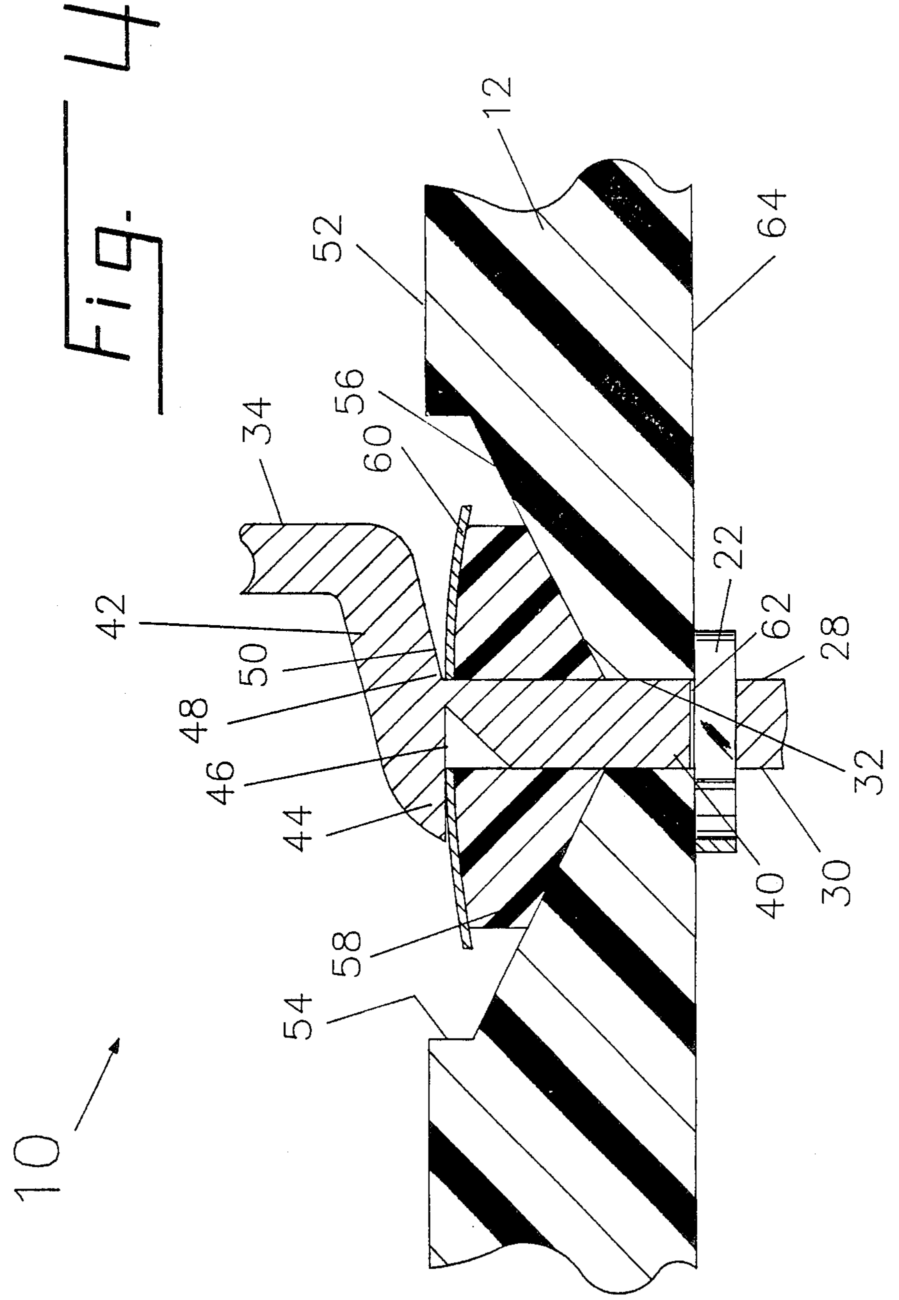
FIG. 4 is an enlarged view of a portion of the terminal of FIG. 3.

Referring now also to FIG. 4, a projection 44, having a bearing surface 46, is formed in a surface of inner extension 40 just at a point where transverse portion 42 joins inner extension 40. A concave angle 48 is formed opposite projection 44, thus providing an under surface 50, generally aligned with bearing surface 46. Base 12 includes an inner surface 52 having a depression 54 therein generally aligned with hole 32. Depression 54 includes a concave conical surface 56 against which is fitted a terminal gasket 58. A metallic washer 60 is engaged by bearing surface 46 and by under surface 50 when cotter pin 22 is fitted in a cotter-pin hole 62. Terminal gasket 58 is compressed into a sealing fit against concave conical surface 56 by downward force produced by tight contact of cotter pin 22 with an outer surface 64 of base 12.

It will be noted that only a single projection 44 is required for urging metallic washer 60 into compressing contact with terminal gasket 58. The opposed side of metallic washer 60 is urged downward by under surface 50. The prior art generally requires one or more projections (not shown) on each side of a terminal for urging metallic washer 60 downward. The requirement of only a single concave angle 48 in the present invention reduces the manufacturing cost of universal terminal 28.

Figure 5:
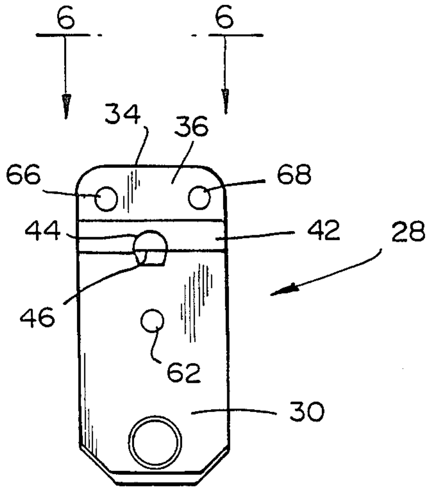
FIG. 5 is a front view of the terminal of FIGS. 3 and 4 with remaining portions of the watthour meter omitted.

Turning now to the front view of universal terminal 28 in FIG. 5, from which the remainder of electric watthour meter 10 is omitted, first and second voltage coil lead connection holes 66 and 68 are disposed in offset portion 34, one near each extremity thereof. As previously noted, the low current drawn by a voltage coil (not shown) permits connection thereof to universal terminal 28 using a soldered joint or a screw. The machine setup time for tapping voltage coil lead connection holes 66 and 68 is substantial. In the short manufacturing runs required by the many different terminal designs of the prior art, the cost of setting up machinery for tapping a voltage coil lead connection hole is often omitted except for specific designs where screw-type connection is a known requirement. Manufacturing runs for the single type of universal terminal 28 provided by the present invention are likely to be large. Thus, an investment of a one-time machine setup for tapping both voltage coil lead connection holes 66 and 68 may be warranted even when it is known that some soldered connections are employed in some of the terminals in some of the watthour meters in which they are installed.

Figure 6:
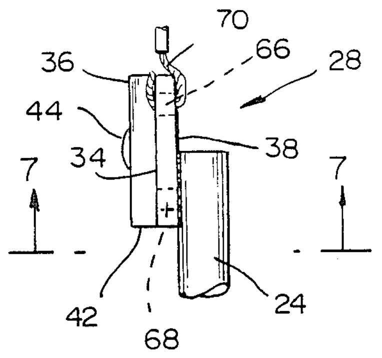
FIG. 6 is a view taken in the direction VI—VI in FIG. 5.
Figure 7:
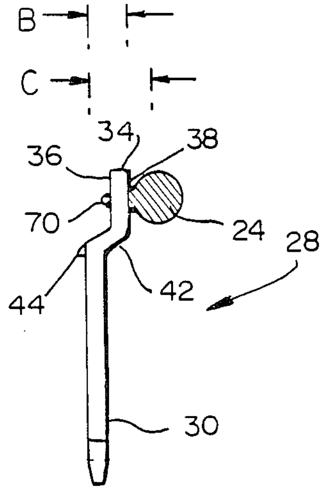
FIG. 7 is a cross section taken along VII—VII in FIG. 6.

Referring now to a top view of universal terminal 28 in FIG. 6 and a corresponding side view in FIG. 7, taken along VII—VII in FIG. 6, current-coil lead 24 is affixed to second face 38 using any convenient means such as, for example, welding or brazing. As best seen in FIG. 6, current-coil lead 24 covers less than all of second face 38, whereby voltage coil lead connection hole 66 is free for insertion of a bared voltage coil lead 70 therethrough. Voltage coil lead 70 is illustrated connected by soldering. Voltage coil lead connection hole 68 is covered by the portion of current-coil lead 24 attached to second face 38. As previously noted, voltage coil lead connection holes 66 and 68 may be threaded without interfering with soldered connection in the manner illustrated.

Referring particularly to FIG. 7, dimension B between the center line of terminal blade 30 and second face 38 is such that an offset dimension C between the center line of terminal blade 30 and a center of current-coil lead 24 places the peripheral surface of current-coil lead 24 in contact with second face 38 with at most, a permissibly small deformation of current-coil lead 24. The position of current-coil lead 24 represents an extreme position to the right corresponding to that illustrated in solid line in FIG. 2.

Figure 8:
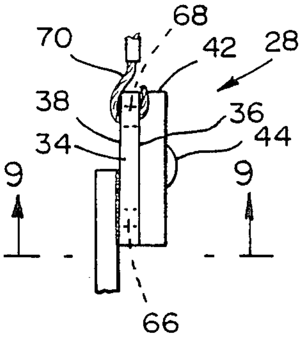
FIG. 8 is a view corresponding to FIG. 6 with a current-coil conductor offset in the opposite direction from FIG. 6.
Figure 9:
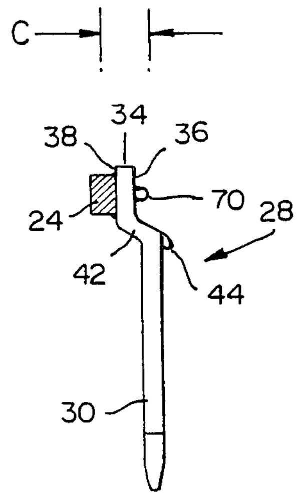
FIG. 9 is a cross section taken along IX—IX in FIG. 8.

FIGS. 8 and 9 represent the opposite extreme of position of current-coil lead 24 to the left of the center line of terminal blade 30 corresponding to the dashed-line position in FIG. 2. In this instance, current-coil lead 24 is illustrated as a rectangular bar. To accommodate this leftward extreme position, universal terminal 28 is rotated 180 degrees about the center line of terminal blade 30. In this case voltage coil lead connection hole 68 is employed for connecting voltage coil lead 70 whereas voltage coil lead connection hole 66 is covered by current-coil lead 24. Thus, it will be noted that, regardless of the direction universal terminal 28 is turned to interface with current-coil lead 24, one or the other of voltage coil lead connection holes 66 and 68 is available for connection of voltage coil lead 70.

Figure 10:
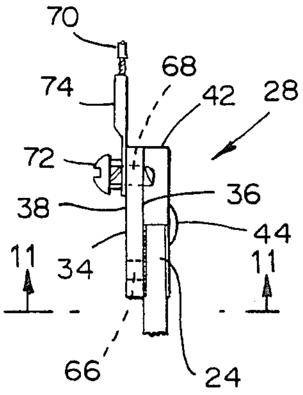
FIG. 10 is a view corresponding to FIG. 6 with a small current-coil conductor offset.
Figure 11:
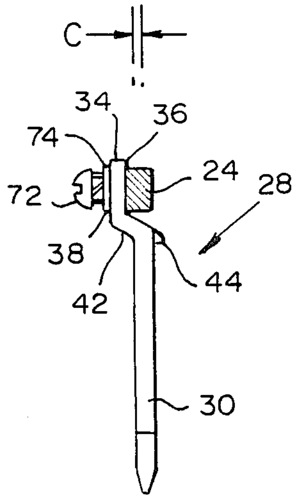
FIG. 11 is a cross section taken along XI—XI in FIG. 10.

Referring now to FIGS. 10 and 11, current-coil lead 24, of rectangular cross section, is dressed to a position wherein the offset dimension C to the left of the center line of terminal blade 30 is quite small compared to its value in FIGS. 6–9. Such a small value of dimension C is accommodated with connection of current-coil lead 24 to first face 36. Voltage coil lead 70 is connected to offset portion 34 using a screw 72 threadably engaged in voltage coil lead connection hole 68. As is conventional, voltage coil lead 70 is preferably connected to a solder terminal 74 which is, in turn, clamped by screw 72. Voltage coil lead connection hole 66, which may also be threaded, is covered by current/coil lead 24 and is unused.

Figure 12:
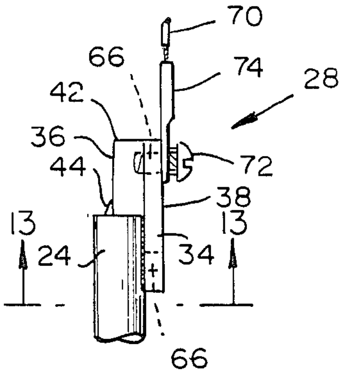
FIG. 12 is a view corresponding to FIG. 10 with a small current-coil conductor offset in the opposite direction from FIG. 10.
Figure 13:
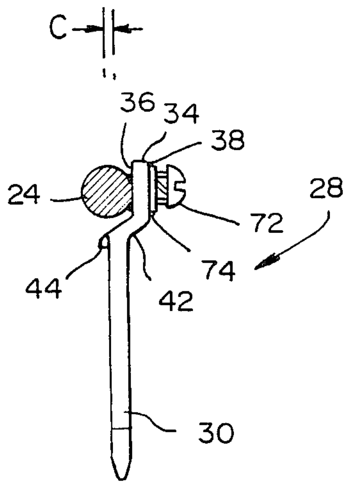
FIG. 13 is a cross section taken along XIII—XIII in FIG. 12.

Similarly, FIGS. 12 and 13 illustrate the accommodation of a small offset dimension to the right of the center line of terminal blade 30 by rotating universal terminal 28 180 degrees about the center line of terminal blade 30 and affixing current-coil lead 24 to first face 36. Voltage coil lead 70 is connected through solder terminal 74 to screw 72 threaded into voltage coil lead connection hole 66. Voltage coil lead connection hole 68 is covered and unused.

It will be clear to those skilled in the art that solder connection and screw connection can be used interchangeably in the embodiments of FIGS. 6–13. In all cases, one of voltage coil lead connection holes 66 or 68 is available for such connection.

A single value of dimension A is shown effective for exact accommodation of four different values of offset dimension C. Slight deformation of current-coil lead 24 may be permissible to extend the four exact offsets into four bands of offsets capable of being accommodated. Indeed, in the preferred embodiment of the invention, a value of dimension A may be chosen to accommodate all values of offset within brace 26 of FIG. 2.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A watthour meter, comprising:
a base;
at least one hole through said base;
a surface surrouding said hole inside said base;
a terminal;
a generally planar terminal blade on said terminal projecting outward from said at least one hole;
a generally planar offset portion on said terminal inside said base;
said offset portion having first and second faces;
said offset portion being generally parallel to said terminal blade;
said offset portion being offset a predetermined distance from a center line of said terminal blade;
a transverse portion connecting an inner extension of said terminal blade and said offset portion;
a resilient terminal gasket surrounding said inner extension and bearing against said surface;
a terminal washer surrounding said inner extension and bearing against an outer surface of said terminal gasket;
said transverse portion having an under surface effective for bearing against said terminal washer at a first side of said terminal;
a projection generally aligned on an opposed side of said terminal with said under surface;
said projection forming a bearing surface for bearing against said terminal washer at a second side of said terminal;
means for urging said terminal outward, whereby said transverse portion and said bearing surface apply compressive force on said terminal washer and said terminal gasket; and
said predetermined distance being effective for permitting attachment to one of said first and second faces to conductors disposed in a vicinity of at least four transverse positions from said center line.

2. A watthour meter according to claim 1 wherein said means for urging includes a pin hole through said terminal blade and a pin engaging said pin hole and bearing against an outer surface of said base.

3. A watthour meter according to claim 2 wherein said pin is a cotter pin.

* * * * *